C. F. KAMRATH.
PROCESS OF RENDERING FATS AND OILS.
APPLICATION FILED NOV. 15, 1919.
1,394,736.  Patented Oct. 25, 1921.
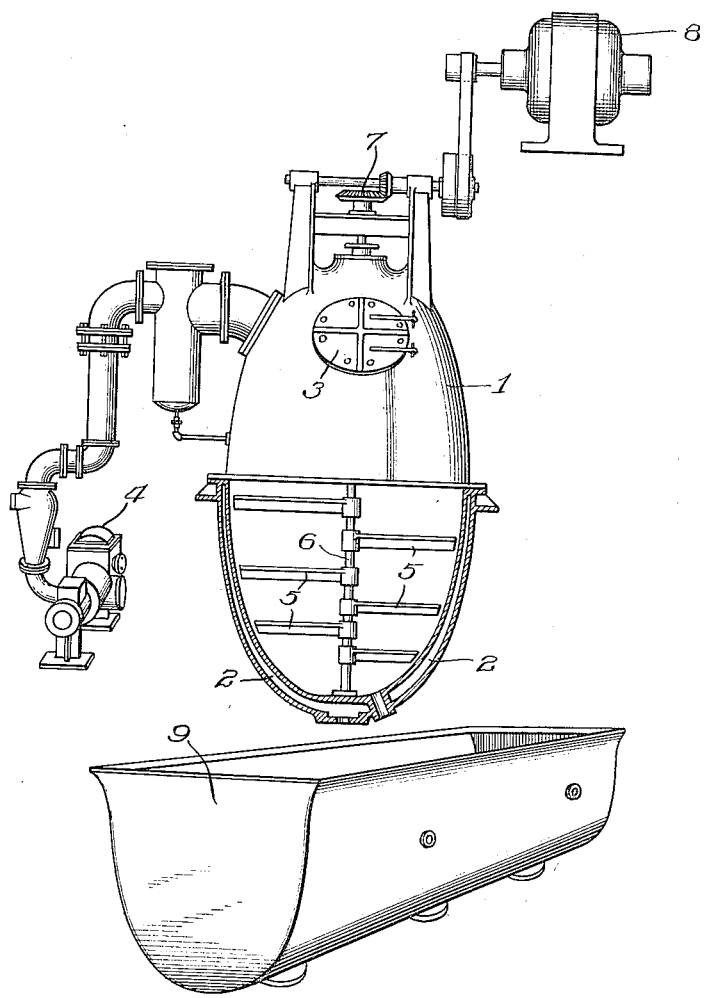
INVENTOR
C. F. Kamrath
BY Munn & Co.
ATTORNEY

United States Patent Office.

CHARLES FREDRICK KAMRATH, OF OMAHA, NEBRASKA.

PROCESS OF RENDERING FATS AND OILS.

1,394,736.  Specification of Letters Patent.  Patented Oct. 25, 1921.

Application filed November 15, 1919. Serial No. 338,249.

*To all whom it may concern:*

Be it known that I, CHARLES F. KAMRATH, a citizen of the United States, and a resident of the city of Omaha, in the county of Douglas and State of Nebraska, have invented a new and useful Improvement in Processes of Rendering Fats and Oils, of which the following is a full, clear, and exact description.

My invention relates to a process of rendering fats and oils, and it consists in the combinations, constructions and arrangements herein described and claimed.

An object of my invention is to provide a process, by means of which fats or oils may be so rendered as to effect a neutral product, and at the same time eliminating much work that is ordinarily required to produce products of the same grade.

A further object of my invention is to provide an economical rendering process, due to the fact that the rendering is conducted at a low temperature, which leaves the product in a neutral condition, thus obviating other steps.

A further object of my invention is to provide a process in which the rendering is accomplished simultaneously with the removal of moisture by evaporation under a vacuum.

Other objects and advantages will appear in the following specification, and the novel features of the invention will be particularly pointed out in the appended claims.

My invention is illustrated in the accompanying drawing, forming part of this application, in which is shown one form of apparatus that may be successfully used to carry out the process.

In carrying out the process, fats, as, for instance, those from hogs, are hashed or cut up into particles and placed inside a vacuum pan, such as that shown at 1 in the drawing. This pan is provided with a steam jacket 2, by means of which steam is supplied to heat the pan. The fats having been placed in the pan, the cover 3 is closed, and at the same time a vacuum pump 4 is started, which removes the moisture from the fats by evaporation. The heat is comparatively low, being from 145°–170° F., with 12–20 inches of vacuum.

During the process of cooking and evaporation, which, it will be noted, are carried on simultaneously, the fats are agitated by means of arms 5 which revolve inside of the vacuum kettle during the cooking process. These arms are attached to the shaft 6 which is driven by a gearing 7 connected with the motor 8.

After the product has been cooked and evaporated, the steam heat is turned off, and the vacuum is reduced. The cooked fats are then removed, settled and strained, and placed in containers for shipment. The residue left from the process is dropped through a hole in the bottom of the vacuum kettle into a steam jacketed container 9, where it is cooked for a period of from one to one and a half hours at a temperature of from 200°–250° F. to remove all particles of fat that are left, and the contents are then treated so as to dry the residue.

There are certain features of this process to which I desire to call particular attention; namely, the simultaneous cooking or rendering of the fats, and the expulsion of the moisture, which is accomplished by means of evaporation under vacuum. Furthermore, the low temperature at which the fats are rendered leaves them in a neutral condition, free from odor. The process does not require any additional steps to deodorize the fats, because the temperature has been kept low enough to prevent compounds having odor, such as those of certain organic acids, from forming.

While the invention relates primarily to rendering fats, it will be understood that the process may be successfully applied to animal or vegetable fats or oils to produce neutral products which are especially desirable for human consumption, since they do not have the odors which fats rendered in other ways sometimes have.

I claim:

1. The herein described process of rendering animal and vegetable fats to produce edible neutral products that consists in simultaneously heating the fats to a temperature of substantially 145°–170° F., agitating the fats, and subjecting the fats to a vacuum of from 12 to 20 inches.

2. The herein described process of treating fatty animal substances that consists in heating the substances to a temperature of substantially 145°–170° F., simultaneously subjecting the substances to a vacuum of from 12 to 20 inches to withdraw the moisture therefrom, then withdrawing the extracted neutral edible fat product, and finally subjecting the residue to a temperature of 200–250° F. to withdraw all particles of fat therefrom and to reduce the residue to the condition of cracklings.

CHARLES FREDRICK KAMRATH.